E ROBBINS.
Running-Gear.
No. 47,334. Patented Apr 18. 1865
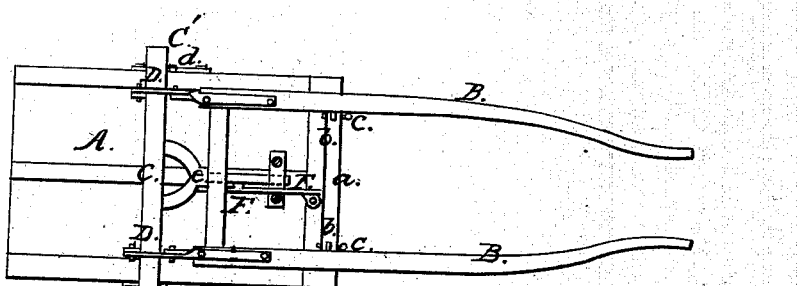
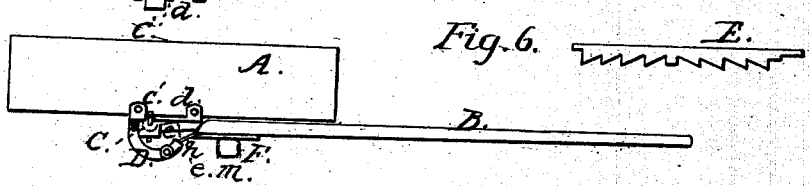
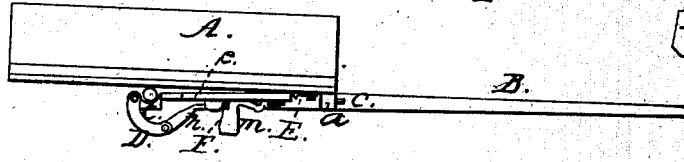
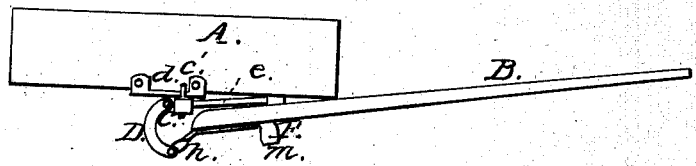
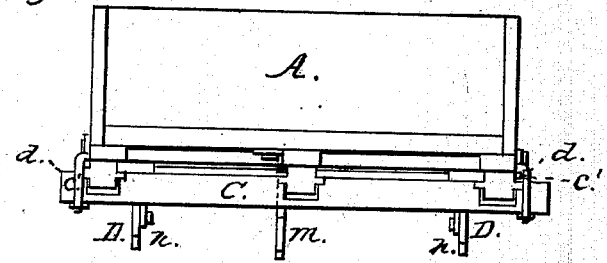

United States Patent Office.

ELISHA ROBBINS, OF WORCESTER, MASSACHUSETTS.

IMPROVEMENT IN CARRIAGES.

Specification forming part of Letters Patent No. 47,334, dated April 18, 1865.

*To all whom it may concern:*

Be it known that I, ELISHA ROBBINS, of the city and county of Worcester, and State of Massachusetts, have invented a new and useful Improvement in Carriages Supported by Two Wheels; and I do hereby declare the same to be fully described in the following specification, and represented in the accompanying drawings, of which—

Figure 1 is an under side view, Fig. 2 a side elevation, and Fig. 3 a longitudinal section, of a cart-body and its thills, with my invention applied thereto, the main purpose of it being to afford relief to the horse by a change of the center of gravity of the cart-body (either empty or loaded) while the cart may be either passing up or going down a hill or inclined plane.

It is well known that when a two-wheel cart is in the act of descending an inclination the center of gravity of its body or load will be thrown forward beyond the perpendicular passing through the axis of the axle. So, in ascending an inclination, the center of gravity of the load would be thrown more or less in rear of the axle. In the first case, the pressure of the load on the horse or draft-animal would be increased, while in the last it would be decreased, and there would be a tendency of the load to tip the cart backward, so as to bring an inconvenient upward pressure on the horse.

With my invention, when the cart may enter upon either an ascent or a descent of a road, there will be a movement of the axle underneath the body and in a direction longitudinal with reference to the center of gravity thereof, the pressure of the load on the axle being so changed by such movement of the axle as to afford more or less relief to the horse or draft-animal in the thills.

In the drawings, A denotes the cart body, having the thills B extended underneath and from the same, as represented, such thills at their front cross-bar, a, being connected to the body by the usual manner—viz., in staples— b b and pins c c the connection being such as to allow the thills to be moved from their position with respect to the body as shown in Fig. 2 into that position of them with reference to the body which is represented in Fig. 4, which is another side elevation of the cart. Fig. 2 exhibits one extreme of movement of the axle, and Fig. 4 represents the other extreme of such movement in respect to the body.

The body is supported on the axle C by friction-rollers carried by the latter. (See Fig. 5, which is a transverse section of the cart, the plane of section being taken through the axis of the axle.) Furthermore, the axle is held to the cart by two clasps or dogs, c′ c′, which project upward from the axle and embrace and hook on two rails, d d, fastened to the sides of the cart.

A tongue, e, extending from the axle, passes through an eye, guide, or clasp projecting from the under side of the body, such tongue and guide serving to preserve the axle at right angles to the sides of the body.

The axle is connected with each of the thills by a curved link or "gooseneck," D, which has one end hinged to the rear side of the axle and the other to a strut, h, extended backward from the thill, the whole being as shown in the drawings. Furthermore, there is applied to the cart-body, and near the middle thereof, a rack, E, provided with serrated teeth, these of one of its halves being made to stand in directions opposite to those of the other half, the same being as shown in Fig. 6, which is a side view of the rack. With the rack, a double pendulous catch, F, operates, it being formed as shown in Fig. 7, and dependent from a center pin going through its part k and the tongue e. The said double catch is provided with a weighted arm, m, and swings freely on the said pin.

From the above it will be seen that when in the act of descending a hill with the cart the horse will press the thills back and raise them more or less. This will cause the axle to move forward relatively to the cart-body, by which movement the center of gravity of the load will be thrown more or less in rear of the axis of the axle, so as to relieve the horse of much if not nearly all the pressure of the load upon his back. So, when the cart may be in the act of ascending an inclined plane, the axle will be moved in an opposite direction, so as to bring the center of gravity of the load in advance of the axis of the axle. This will prevent the cart from "tipping up" and throw the proper amount of weight of the load on the horse.

The object of the double pendulous catch and its rack is to prevent the too sudden shifting of the center of gravity of the load when the wheels may enter a gully or ditch extending across the roadway, or the horse may suddenly start either forward or backward. Under such circumstances the gravitating power of the weighted arm $m$ will so cause the catch to be moved into action with the rack as to check the movement of the axle relatively to the body.

I claim as my invention--

1. The application of the axle to the cart-body so as to be capable of moving underneath and with reference to such body in manner as described, and connecting the axle with the thills, and the latter with the body by mechanism, substantially as specified.

2. In combination with the axle so applied to the body and thills, the rack and pendulous double catch or the equivalents thereof, such being applied to the body and axle substantially as and to operate as described.

3. The combination of the tongue $e$ and the eye or clasp $f$, or their mechanical equivalents, with the axle, applied to the cart-body and the thills in manner and to operate substantially as explained.

ELISHA ROBBINS.

Witnesses:
R. H. EDDY,
F. P. HALE, Jr.